United States Patent
Luo et al.

(10) Patent No.: US 11,457,502 B2
(45) Date of Patent: Sep. 27, 2022

(54) METHOD AND DEVICE FOR DETECTING PARTIAL DISCONTINUOUS TRANSMISSION (DTX) USING CHANNEL ESTIMATION DATA

(71) Applicant: Hong Kong Applied Science And Technology Research Institute Co., Ltd., Shatin (HK)

(72) Inventors: Yaming Luo, Kowloon (HK); Yunxiang Yao, Sai Kung (HK); Man Wai Kwan, Ma On Shan (HK); Xiangyu Liu, Shenzhen (CN); Yiu Wing Edwin Chan, Ma On Shan (HK); Kong Chau Tsang, Kowloon (HK)

(73) Assignee: Hong Kong Applied Science And Technology Research Institute Co., Ltd, New Territories (HK)

( * ) Notice: Subject to any disclaimer, the term of this patent is extended or adjusted under 35 U.S.C. 154(b) by 123 days.

(21) Appl. No.: 17/171,190

(22) Filed: Feb. 9, 2021

(65) Prior Publication Data
US 2022/0256642 A1    Aug. 11, 2022

(51) Int. Cl.
*H04W 76/20* (2018.01)
*H04W 72/04* (2009.01)
*H04W 76/28* (2018.01)

(52) U.S. Cl.
CPC ......... *H04W 76/28* (2018.02); *H04W 72/046* (2013.01); *H04W 72/0413* (2013.01); *H04W 72/0446* (2013.01); *H04W 72/0453* (2013.01)

(58) Field of Classification Search
CPC ............. H04W 76/28; H04W 72/0413; H04W 72/0446; H04W 72/0453; H04W 72/046
See application file for complete search history.

(56) References Cited

U.S. PATENT DOCUMENTS

| | | | |
|---|---|---|---|
| 8,315,185 B2 | 11/2012 | Chan | |
| 2003/0086379 A1* | 5/2003 | Terry | H04W 52/44 370/294 |

(Continued)

FOREIGN PATENT DOCUMENTS

| | | |
|---|---|---|
| CN | 103037396 A | 4/2013 |
| CN | 104168095 B | 11/2014 |

(Continued)

OTHER PUBLICATIONS

LG Electronics, "Feature lead summary for agenda item 7.2.4.1.2 Physical layer procedures 3GPP TSG RAN WGI Meeting #95 R1-1813938", Nov. 16, 2018.

*Primary Examiner* — Brian D Nguyen
(74) *Attorney, Agent, or Firm* — GableGotwals (57) ABSTRACT

Described is a method and device for detecting a discontinuous transmission state (DTX) at an uplink control information (UCI) receiver device in a wireless communication system. The method involves receiving a linear block encoded signal on an uplink (UL) at said UCI receiver device and processing the received linear block encoded signal after resource element (RE) demapping to obtain channel estimation data. The method includes determining from said channel estimation data a DTX metric for one or more selected resource blocks (RBs) and determining if a DTX state has occurred by comparing the determined DTX metric to a calculated, selected, or predetermined threshold.

20 Claims, 7 Drawing Sheets

(56) References Cited

U.S. PATENT DOCUMENTS

| | | | | |
|---|---|---|---|---|
| 2009/0245284 A1* | 10/2009 | Xu | ................... | H04L 1/0028 |
| | | | | 370/474 |
| 2011/0239076 A1* | 9/2011 | Liu | ................... | H03M 13/6525 |
| | | | | 714/751 |
| 2019/0334669 A1* | 10/2019 | Akkarakaran | ........ | H04L 1/1607 |
| 2022/0167120 A1* | 5/2022 | Kassir | ................... | H04W 4/023 |
| 2022/0183063 A1* | 6/2022 | Talarico | .............. | H04W 74/008 |
| 2022/0231701 A1* | 7/2022 | Furtek | ............... | H03M 13/6312 |

FOREIGN PATENT DOCUMENTS

| | | | |
|---|---|---|---|
| CN | 104283821 | A | 1/2015 |
| CN | 105072060 | A | 11/2015 |
| CN | 105491591 | A | 4/2016 |
| CN | 106255136 | A | 12/2016 |
| CN | 109983723 | A | 7/2019 |

* cited by examiner

METHOD AND DEVICE FOR DETECTING PARTIAL DISCONTINUOUS TRANSMISSION (DTX) USING CHANNEL ESTIMATION DATA

INCORPORATED BY REFERENCE

Applicant's pending utility patent application Ser. No. 16/254,964 filed on 23 Jan. 2019 entitled "Method and an Apparatus for Improving a Determination of HARQ-ACK Messages in a Wireless Communications System", applicant's pending utility patent application Ser. No. 16/827,883 filed on 24 Mar. 2020 entitled "An Improved Method and Device for Detecting Discontinuous Transmission (DTX) for Small Block Encoded Signals", applicant's pending utility patent application Ser. No. 16/922,150 filed on 7 Jul. 2020 entitled "Method and an Apparatus for Physical Uplink Control Channel (PUCCH) Discontinuous Transmission (DTX) Determination in a Wireless Communications System", and applicant's pending utility patent application Ser. No. 17/141,725 filed on 5 Jan. 2021 entitled "A Method and Device For Detecting Partial Discontinuous Transmission (DTX) Using Soft Bits Correlation" are each incorporated herein by way of reference.

FIELD OF THE INVENTION

The invention relates particularly, but not exclusively, to an improved method and device for detection of discontinuous transmission (DTX) on an uplink (UL) at an uplink control information (UCI) receiver device in a wireless communication network using channel estimation data. More specifically, the invention relates to Physical Uplink Control Channel (PUCCH) which carries the UCI feedback from a user equipment (UE) to a base station (BS) if a downlink (DL) control signal is received by the UE from the BS. The invention relates particularly, but not exclusively, to detection of partial DTX in small block encoded signals on the UL.

BACKGROUND OF THE INVENTION

In long-terra evolution (LTE) communications systems, in a DL, a data payload is carried by transport blocks which are encoded into codewords which are sent over a DL physical data channel called the Physical Downlink Shared Channel (PDSCH). The scheduling information of the PDSCH codeword(s), including its resource allocation in the subframe and its modulation and coding, scheme, is included in the physical control channel, called the Physical Downlink Control Channel (PDCCH). Generally, the receiving user equipment (UE) decodes the messages in PDCCH and, where it finds that a PDSCH has been assigned to it, it decodes the PDSCH codeword(s) according to the scheduling information decoded from the PDCCH. In other words, correctly decoding PDCCH is a prerequisite for properly decoding PDSCH.

In order to prevent the loss of transport blocks, LTE has adopted the Hybrid Automatic Repeat Request (HARQ) scheme. In the physical layer of Evolved UMTS Terrestrial Radio Access Network (E-UTRA), HARQ is implemented both in the UL and the DL. The acknowledgement message in E-UTRA is denoted as HARQ-ACK.

HARQ-ACK may be transmitted by the UE in response to certain PDSCH transmissions and includes one or several acknowledgements, either positive (ACK) or negative (NACK) in response to transport blocks transmitted in the DL. HARQ-ACK may be transmitted on one of the physical channels PUCCH or Physical Uplink Shared Channel (PUSCH).

But if the UE is not able to correctly decode the PDCCH, it cannot correctly decode PDSCH, and may even not know that it needs to send the HARQ feedback. This is called Discontinuous Transmission (DTX).

If the eNodeB (base station (BS)) detects ACK instead of DTX a so called ACK false detection, the eNodeB will erroneously consider the corresponding DL transport block as correctly received. Since the transport block has not been correctly received by the UE, corresponding data will not be passed to the Medium Access Control (MAC) layer and from the MAC layer to the Radio Link Control (RLC) layer. Data will hence be missing in the RLC layer. This will cause ARQ retransmissions in the RLC layer which introduce delay and possibly large retransmissions which is very undesirable. Also, if a NACK is detected erroneously that in reality is DTX, the eNodeB will retransmit the packet in such a way that the UE will not be capable of decoding it.

As already indicated, a problem arises when the UE is not aware of the presence of the PDSCH assigned to it if it fails to decode the PDCCH successfully. In this case the UE not generate ACK/NACK information. This situation has been well recognized and the UE response in such case is DTX, that is, neither an ACK nor a NACK signal is transmitted to the eNodeB. Since the eNodeB has no prior knowledge of whether the UE has failed to detect the PDCCH, it expects or deems, that the symbols of the predetermined positions are ACK/NACK symbols and extracts them for the ACK/NACK decoder to decode. If the eNodeB disregards the possibility of DTX, either an ACK or NACK message will be returned by the ACK/NACK decoder to a higher layer upon the decoding of the extracted symbols, which are, in fact, conveying no information, in general, both ACK and NACK messages are equally likely to be returned.

The consequence of wrongly detecting a DTX as an ACK is more adverse to the system performance than wrongly detecting a DTX as a NACK.

Similarly, in 5G (or new radio (NR)) wireless communication systems, a message feedback scheme is also used for re-transmission control. ACK or NACK (AN) signals are used to indicate whether the signal is received successfully or not by the UE and whether the BS needs to retransmit the data. If the UE misses a DL control signal, the UE may encounter DTX in DL and the UE will not send any message back to the BS. However, the BS needs to detect one of three possible feedback states, i.e., ACK, NACK or DTX, for rearranging a next transmission to the UE.

Figure 1:
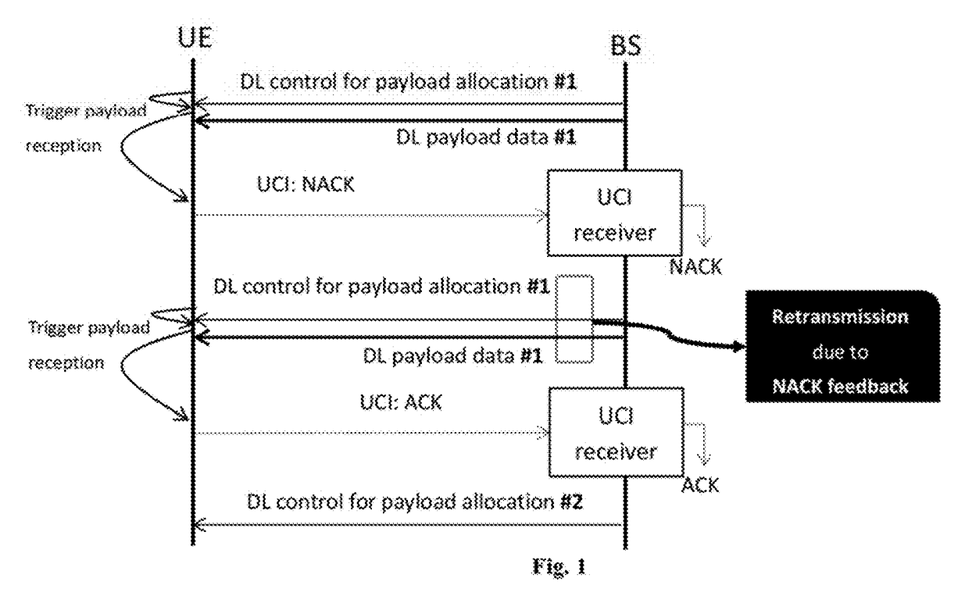
FIG. 1 is a signal diagram illustrating message exchanges between a BS and a UE for retransmission of control data and payload data.

FIG. 1 illustrates a method by which UL signals from the UE to the BS control transmission of payload control data and payload data on the DL from the BS to the UE. In the example of FIG. 1, it can be seen that, in response to a first "DL control for payload allocation #1" message from the BS to the UE, the UE, in this instance, responds with a UCI "NACK" message, The NACK message is received by the UCI receiver device at the BS and, as a consequence, the BS is configured to retransmit to the UE the first "DL control for payload allocation #1" message and its associated first "DL payload data #1" message. In this example, the UE then returns a UCI "ACK" message to the UCI receiver device in response to the retransmitted control signal message and, as a consequence, the BS is configured to then transmit to the UE the second "DL control for payload allocation #2" message and its associated second "DL payload data #2" message (not shown in FIG. 1). FIG. 1 therefore illustrates how data is retransmitted by the BS to the UE when the UE indicates that it has not successfully received a DL data control message.

Figure 2:
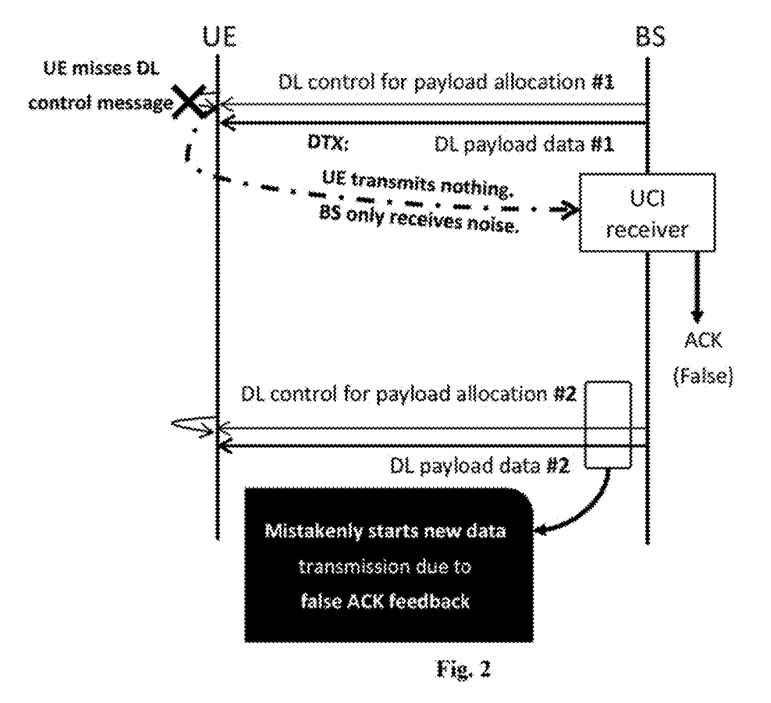
FIG. 2 is a signal diagram illustrating errant transmission of control data and payload data from a BS to a UE when a UCI receiver device at the BS determines a false ACK message.

In contrast, FIG. 2 illustrates what may happen when the UE misses a DL data control message. In this example, the UE has missed the first "DL control for payload allocation #1" message and consequently sends no ACK/NACK message back to the BS in response. This scenario represents a DTX state. The UCI receiver device at the BS only receives noise but processes this as though it comprises an UL UCI signal with the result that, in this example, the UCI falsely detects or determines receipt of an ACK message from the UE and thus outputs a false ACK message. This causes the BS to commence a new control and payload data transmission in response to the false ACK message, e.g., "DL control for payload allocation #2", etc.

Figure 3:
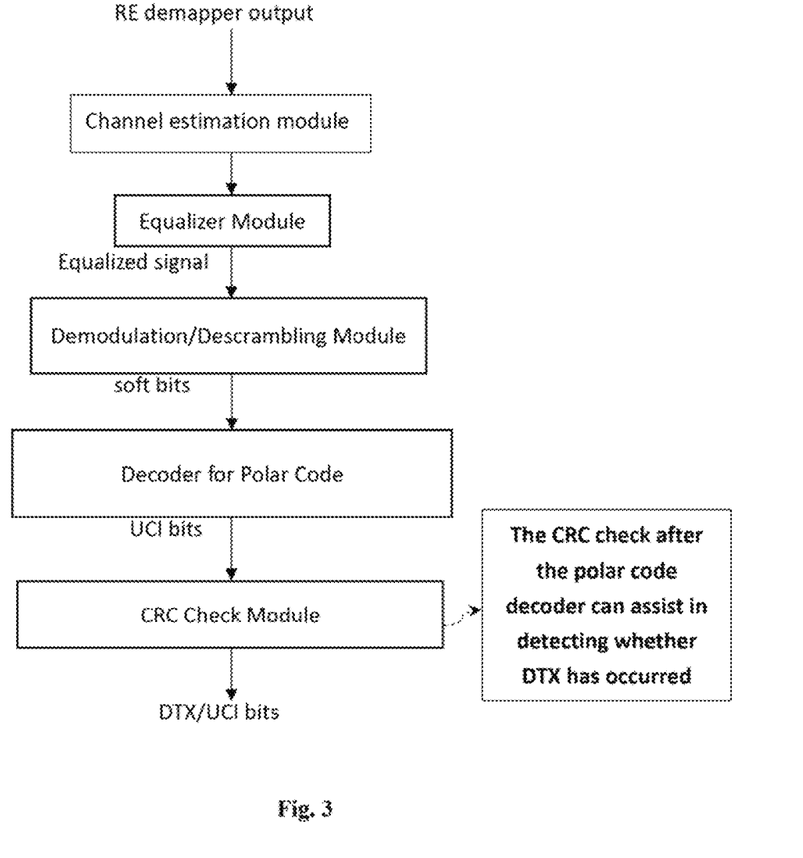
FIG. 3 is a block schematic diagram of a conventional polar code-based receiver for a 5G communications system.
Figure 4:
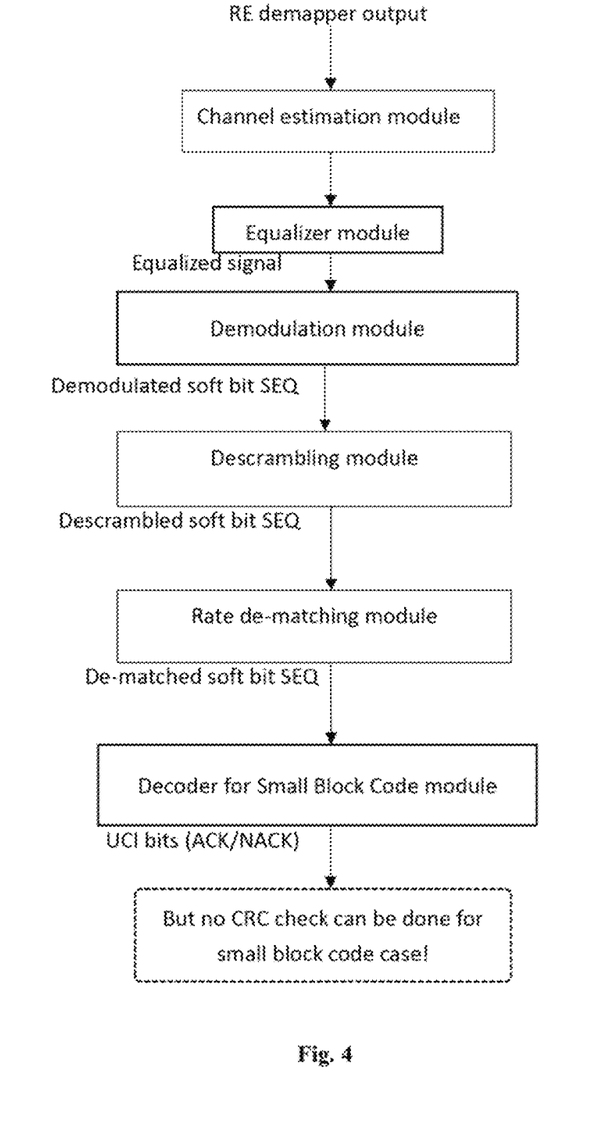
FIG. 4 is a block schematic diagram of a conventional small block code-based receiver for a 5G communications system.

For 5G UCI, 3GPP Technical Specification 38.212 requires the support of two types of channel codes, namely polar code and small block code as illustrated respectively by FIGS. 3 and 4. Polar code relates to the situation where the number of payload bits is greater than 11. Small block code relates to the situation where the number of payload bits is equal to or less than 11.

As shown in FIG. 3, in a conventional polar code-based receiver, a cyclic redundancy check (CRC) may assist in detecting whether or not DTX occurs. The output from the polar code decoder comprises UCI bits but the CRC check function (module) enables the polar code-based receiver to distinguish between DTX on the one hand and UCI bits indicative of ACK or NACK on the other hand.

In FIG. 4 which shows a conventional small block code-based receiver where a CRC function is not available, incorrect detection of the ACK, NACK, or DTX signals leads to a waste of resources for retransmission and/or a loss of data packets. In the conventional small block code-based receiver where CRC is not available, ACK and NACK each issue with about 50% probability where the UE misses a DL control message and transmits nothing to the UE such that the BS receives only noise. In the small block code-based receiver, the output from the small block code decoder is assumed to be UCI bits leading to possible false ACK or false NACK outcomes. In other word, there is no means for distinguishing between DTX on the one hand and UCI bits indicative of ACK or NACK on the other hand.

In the conventional small block code-based UCI receiver device of FIG. 4, the resource element (RE) demapper output will be treated first by a channel estimation module to provide channel estimation data and then by an equalizer module to generate an equalized signal. The equalized signal will then be treated by a demodulation module to generate a demodulated soft bit sequence (SEQ). The demodulated soft bit SEQ will be handled by a descrambling module to create a descrambled soft bit SEQ. The descrambled soft bit SEQ will then be handled by a rate de-matching module to create a de-matched soft bit SEQ. The de-matched soft bit SEQ will be decoded through a decoder for small block code module to generate UCI bits (ACK/NACK). The soft bits comprise real signal values which differ from hard bits which are resolved to binary values.

As already explained with respect to FIGS. 1 and 2, if a UE loses a DL control signal, the UE will not send UCI ACK/NACK feedback, i.e., a DTX state will occur. The BS treats DTX as an unsuccessful DL transmission. Re-transmission is required if and when DTX occurs. But if the DTX is falsely detected as ACK, re-transmission will not be performed. More especially, DTX may occur only partially, i.e., only part of the UCI payload bits may be missing. Compared with full DTX where all UCI bits are missing, partial DTX is much more difficult to detect. From a perspective of the small block code-based UCI receiver device, a partial DTX codeword still belongs to the set of valid codewords. In view of the fact that the small block code-based UCI receiver device has no CRC check to assist with full or partial DTX detection, there is a need to be able to effectively detect partial DTX, i.e., there is a need to effectively distinguish a partial DTX signal from a non-DTX signal.

CN104168095 discloses a UCI receiver device which is configured to decode the descrambled sequence to obtain a received UCI b. It then obtains a canonical sequence by selecting a sub-sequence with 32 soft bits from the descrambled sequence. It decodes the canonical sequence to obtain a canonical UCI r. It then compares the received UCI with the canonical UCI r to determine if a DTX state has occurred. This is a highly complex solution which requires a high signal to noise ratio (SNR) to decode UCI. It is difficult to select a suitable canonical sequence.

CN 105491591 discloses a UCI receiver device which is configured to divide the descrambled sequence into N blocks each containing 32 soft hits. It then compares the signs of soft bits in a first block with all other N-1 blocks. It computes the number of same sign pairs as a, and the number of different sign pairs as b. It compares the ratio a/b with a predetermined DTX threshold value Th. If a/b is less than or equal to Th then a DTX state is determined to have occurred, but, if a/b is greater than Th, then no DTX state is determined to have occurred. The DTX decision is a hard decision based on the signs of the soft bits. The decision is sensitive to the noise or UL channel impairment. If the number of non-DTX blocks of the N blocks is much higher than the number of DTX blocks then the ratio a/b can still be high meaning that it is hard to determine if a DTX state has occurred using this metric. It is therefore difficult to detect DTX if only some RBs in any of the N blocks suffer DTX. Furthermore, different DTX scenarios between RBs within a 32-bit block are not considered.

CN103037396 discloses a signal detection method in LIE ascending control channel. The method comprises obtaining noise power estimate and channel response power estimate for at least one antenna. A Decision Variable (DV) is obtained by combining the noise power estimate and the channel response power estimate of at least one antenna. However, this reference fails to teach or suggest determining per-resource block (RB) DTX metrics.

CN 104283821 discloses obtaining control information and reference signal $\bar{r}$ as well as a local reference signal (LocalRS) and subsequently deriving frequency domain channel estimate $\hat{H}$ by a least square (LS) estimation from $\hat{H}=\bar{r}/\text{LocalRS}$. This reference teaches calculating combined power $P_k$ by combining all the power associated with the same tap of an antenna within all time slots which are associated with the average of frequency domain channel estimate $\hat{H}_{53,i,B}$ of all antennas. However, it fails to teach calculating per-RB DTX metrics.

Among other things, what is therefore desired is a method for distinguishing a partial DTX signal from a non-DTX signal. There is also a need to effectively distinguish partial DTX from the non-DTX signal with low false alarm rate (FAR) and missed detection rate (MDR), There is also a need to detect a DTX state or a partial DTX state at an earlier stage of the workflow of UCI receiver devices.

OBJECTS OF THE INVENTION

An object of the invention is to mitigate or obviate to some degree one or more problems associated with known methods of determining or detecting DTX on a UL at a UCI receiver device in a wireless communication network.

The above object is met by the combination of features of the main claims; the sub-claims disclose further advantageous embodiments of the invention.

Another object of the invention is to provide a method of distinguishing a partial DTX signal from a non-DTX signal on a UL at a UCI receiver device in a wireless communication network.

Another object of the invention is to provide an improved UCI receiver device.

A further object of the invention is to provide an improved small block code-based UCI receiver device.

One skilled in the art will derive from the following description other objects of the invention. Therefore, the foregoing statements of object are not exhaustive and serve merely to illustrate some of the many objects of the present invention.

SUMMARY OF THE INVENTION

The invention relates to a method for determining DTX an PUCCH which carries the UL UCI feedback from a UE to a BS if a DL control signal is received by the UE from the BS. Particularly, it provides a method which can effectively and efficiently distinguish between a partial DTX state and a non-DTX state. It is particularly useful for partial DTX detection in certain PUCCH formats such as PUCCH Format 2 with one Orthogonal Frequency Division Multiplexing (OFDM) symbol and only one RB not validly used due to occurrence of a full or partial DTX state, i.e., a 'dropped' RB.

In a first main aspect, the invention provides a method and device for detecting a discontinuous transmission state (DTX) at an uplink control information (UCI) receiver device in a wireless communication system. The method involves receiving a linear block encoded signal on an uplink (UL) at said UCI receiver device and processing the received linear block encoded signal after resource element (RE) demapping to obtain channel estimation data. The method includes determining from said channel estimation data a DTX metric for one or more selected resource blocks (RBs) and determining if a DTX state has occurred by comparing the determined DTX metric to a calculated, selected, or predetermined threshold.

In a second main aspect, the invention provides a UCI receiver device in a wireless communication system, the UCI receiver device comprising: a memory storing machine-readable instructions; and a processor for executing the machine-readable instructions such that, when the processor executes the machine-readable instructions, it configures the UCI receiver device to implement the method of the first main aspect of the invention.

In a third main aspect, the invention provides a non-transitory computer-readable medium storing machine-readable instructions, wherein, when the machine-readable instructions are executed by a processor of a UCI receiver device in a wireless communication system, they configure the processor to implement the method of the first main aspect of the invention.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood.

Additional features and advantages of the invention will be described hereinafter which form the subject of the claims of the invention. It will be appreciated by those skilled in the an that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF THE PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS, may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus he appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the an that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be consulted to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Figure 5:
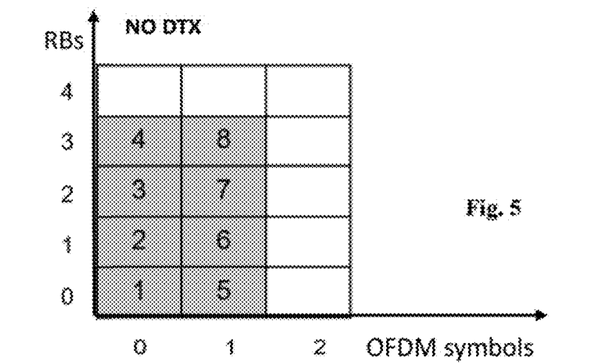
FIG. 5 illustrates an RE map for PUCCH Format 2 where no DTX state has occurred.

FIG. 5 illustrates a RE map for PUCCH Format 2 for a linear block encoded signal received at a small block code-based UCI receiver device of a BS where no DTX state has occurred. In this case, all RBs or PUCCH units are successfully received, each of which comprises 16 bits for a total of 128 bits transmitted.

Figure 6:
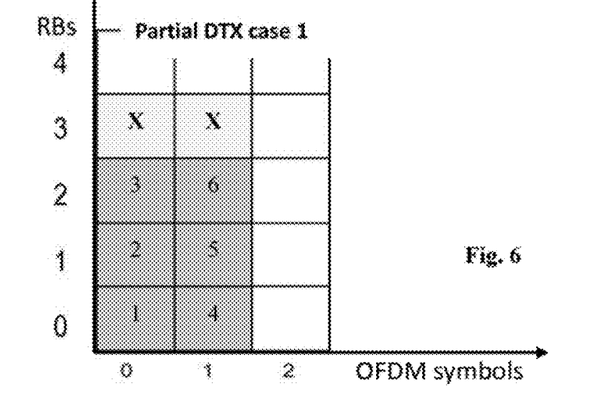
FIG. 6 illustrates an RE map for PUCCH Format 2 where a first partial DTX state has occurred.
Figure 7:
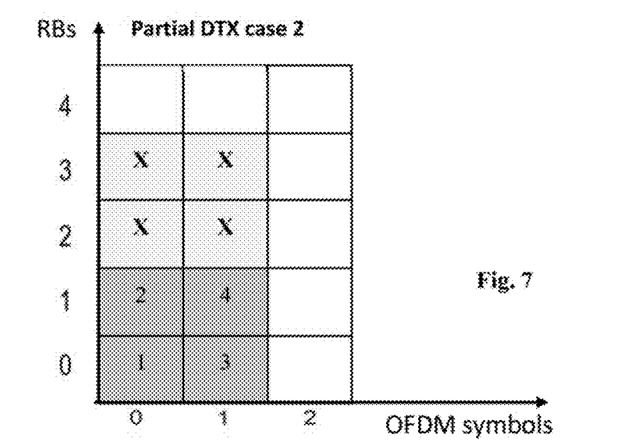
FIG. 7 illustrates an RE map for PUCCH Format 2 where a second partial DTX state has occurred.
Figure 8:
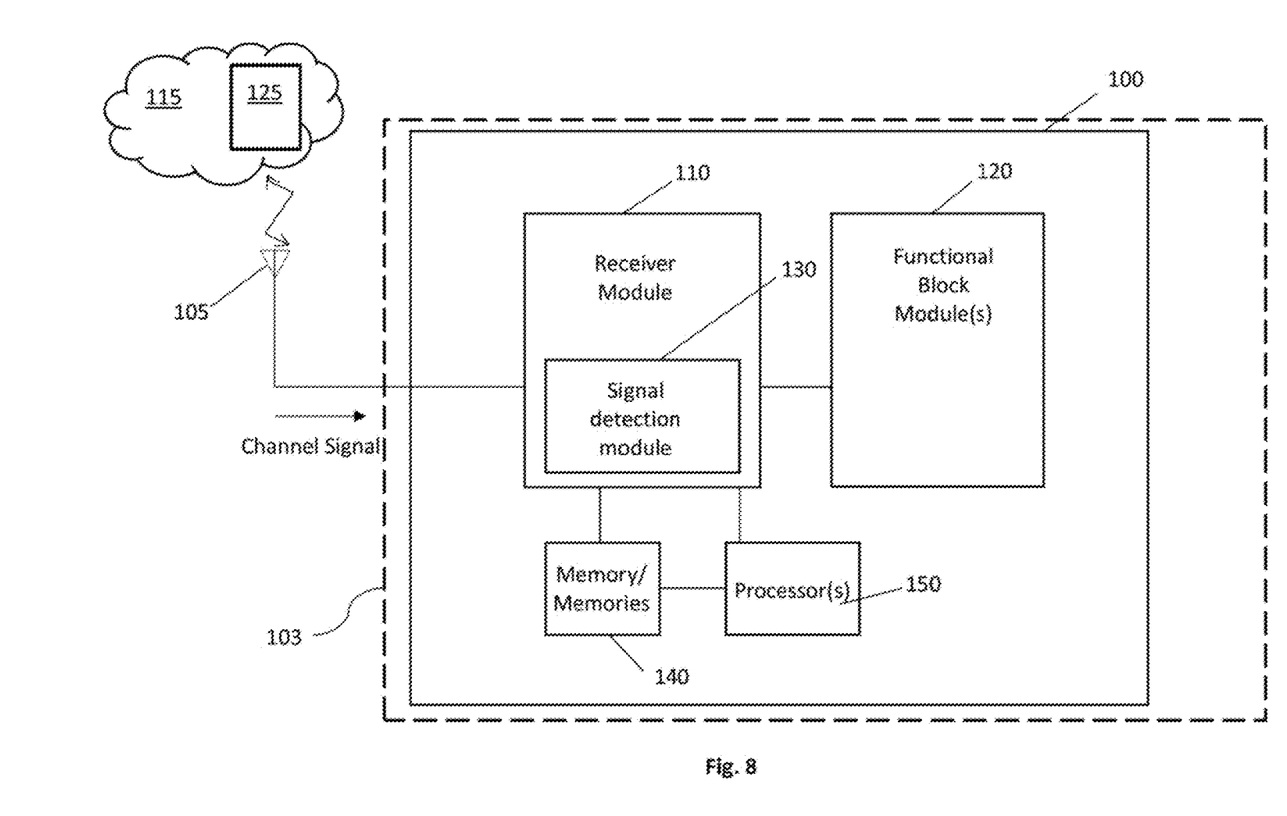
FIG. 8 is a block schematic diagram of an improved UCI receiver device in accordance with the invention.

By way of illustrating one of the technical problems addressed by the present invention, reference is now made to FIGS. 6 to 8.

FIG. 6 illustrates the RE map for PUCCH Format 2 for the linear block encoded signal received at the small block code-based UCI receiver device of the BS where a first partial DTX state has occurred. In this instance, the last RB for each symbol is not successfully transmitted and noise denoted in FIG. 6 as "X" is received in each missing RB's place. However, the UCI receiver device will assume that the received noise comprises a valid part of the received linear block encoded signal and will process it as such which may lead to a false ACK or NACK state. A partial DTX represents an unsuccessful DL transmission and needs to be treated as a DTX state. For a small block code-based UCI receiver device, DTX is difficult to determine or detect, but partial DTX is especially difficult to detect or determine compared to a full DTX state where all of the RBs for the symbols are not successfully transmitted and only noise is received at the UCI receiver device.

FIG. 7 illustrates the RE map for PUCCH Format 2 for the linear block encoded signal received at the small block code-based UCI receiver device of the BS where a second partial DTX state has occurred. In this instance, the last 2 RBs or PUCCH units for each symbol are not successfully transmitted and noise is received in each missing RB's place.

The invention is therefore directed to solving at least the aforementioned technical problem by providing a method and a device in the form of a UCI receiver device to detect a partial DTX state by distinguishing a partial DTX signal from a non-DTX signal.

FIG. 8 shows an exemplary embodiment of an improved UCI receiver device 100 in accordance with concepts of the present invention. In the illustrated embodiment, the UCI receiver device 100 may comprise communication equipment such as a network node, a network card, or a network circuit communicatively connected to or forming part of a BS 103 (denoted by dashed line in. FIG. 8), etc. operating in a 5G communications system environment 115, although the improved UCI receiver 100 of the invention is not limited to operating in a 5G communications system but could comprise a UCI receiver for a 4G cellular network or any cellular network. The BS 103 communicates with one or more UEs 125.

The UCI receiver 100 may comprise a plurality of functional blocks for performing various functions thereof. For example, the UCI receiver 100 includes receiver module 110 providing received signal processing and configured to provide received signals and/or information extracted therefrom to functional block module(s) 120 such as may comprise various data sink, control element(s), user interface(s), etc. Although receiver module 110 is described as providing received signal processing, it will he appreciated that this functional block may be implemented as a transceiver providing both transmitted and received signal processing. Irrespective of the particular configuration of receiver 110, embodiments include signal detection module 130 disposed in association with the receiver module 110 for facilitating accurate processing and/or decoding of a received channel signal in accordance with the invention. Channel signals may be received via an antenna module 105.

Although the signal detection module 130 is shown as being deployed as part of the receiver module 110 (e.g., comprising a portion of the receiver module control and logic circuits), there is no limitation to such a deployment configuration according to the concepts of the invention. For example, the signal detection module 130 may be deployed as a functional block of UCI receiver device 100 that is distinct from, but connected to, receiver module 110. The signal detection module 130 may, for example, be implemented using logic circuits and/or executable code/machine readable instructions stored in a memory 140 of the UCI receiver device 100 for execution by a processor 150 to thereby perform functions as described herein. For example, the executable code/machine readable instructions may be stored in one or more memories 140 (e.g., random access memory (RAM), read only memory (ROM), flash memory, magnetic memory, optical memory or the like) suitable for storing one or more instruction sets (e.g., application software, firmware, operating, system, applets, and/or the like), data (e.g., configuration parameters, operating parameters and/or thresholds, collected data, processed data, and/or the like), etc. The one or more memories 140 may comprise processor-readable memories for use with respect to one or more processors 150 operable to execute code segments of signal detection module 130 and/or utilize data provided thereby to perform functions of the signal detection module 130 as described herein. Additionally, or alternatively, the signal detection module 130 may comprise one or more special purpose processors (e.g., application specific integrated circuit (ASIC), field programmable gate array (FPGA), graphics processing unit (GPU), and or the like configured to perform functions of the signal detection module 130 as described herein.

Figure 9:
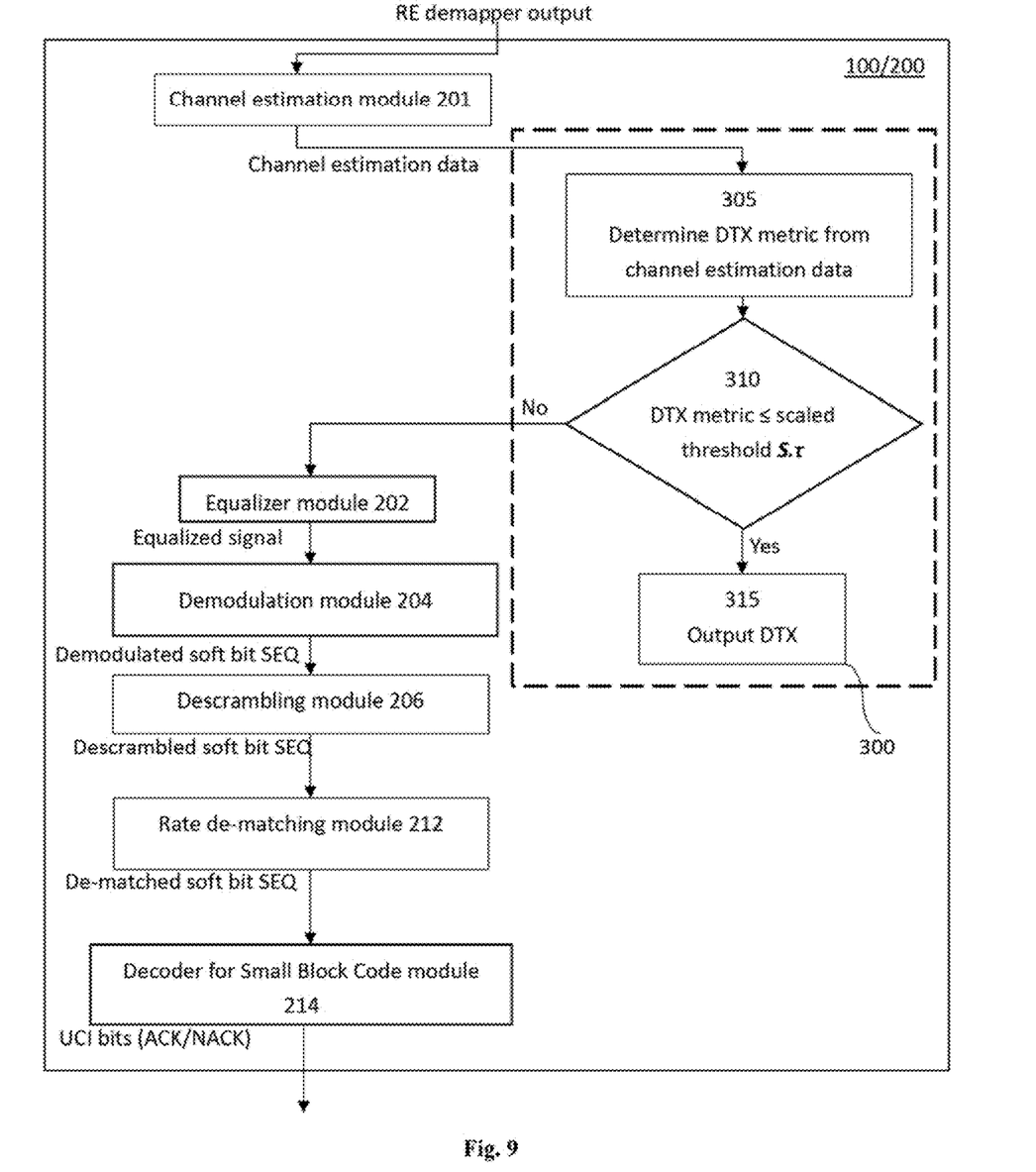
FIG. 9 is a schematic block diagram of the improved UCI receiver device in accordance with the invention illustrating in principle a method in accordance with the invention performed by said UCI receiver device.

FIG. 9 a schematic block diagram of the improved UCI receiver device in accordance with the invention illustrating a method 300 in accordance with the invention implemented by the signal detection module 130 (FIG. 8) for the improved linear block code-based UCI receiver device 100/200. The method 300 is denoted by dashed line box 300 in FIG. 9. In one embodiment, the UCI receiver 100/200 is configured to receive a UL UCI signal as a RE demapper output signal. The RE demapper output signal is initially processed in a channel estimation module 201 to provide channel estimation data for the received UL UCI signal.

In a first step 305 of the method 300, the signal detection module 130 determines a DTX metric for the received UL UCI signal from the channel estimation data. The channel estimation data preferably comprise raw channel estimation data obtained by multiplying one or more received reference signals by one or more conjugates of corresponding local reference signals of the received UL UCI signal. Step 305 preferably comprises the signal detection module 130 determining said DTX metric for one or more selected RBs of the received UL UCI signal. The one or more selected RBs preferably comprise the one or more RBs that are not being validly used due to occurrence of a full or partial DTX state, i.e., the one or more dropped RBs. Preferably also, the received UL UCI signal is processed to obtain the channel estimation data prior to the received UL UCI signal being processed by the equalizer module 202 of said UCI receiver device 100/200.

In a second decision step 310, the signal detection module 130 compares the DTX metric for the received UL UCI signal derived from the channel estimation data to a calculated, selected, or predetermined threshold τ to determine if a full or partial DTX state has occurred. Preferably, the threshold τ used in the comparison step 310 is a scaled threshold, being scaled by a scaling factor S to provide a scaled threshold value S·τ for step 310. Preferably, the scaled threshold value S·τ is a product of a normalized threshold τ and the scaling factor S. The determination of the scaling factor S is described hereinbelow.

If, at decision step 310, it is determined that the DTX metric for the received UL UCI signal derived from the channel estimation data is less than or equal to the scaled threshold value S·τ then, at step 315, the signal detection module 130 outputs an indication that a DTX state is detected in the received UL UCI signal. In such case, processing of the received UL UCI signal can be terminated. An advantage of the method 300 is that, where a DTX state in the received UL UCI signal is detected, processing of said received UL UCI signal can he terminated very early in the signal process compared to, for example, a UCI receiver device being operated in a conventional manner. In this instance, the method 300 enables processing of the received UL UCI signal to be terminated prior to said signal being processed in the equalizer module 202.

If, however, at decision step 310, it is determined that the DTX metric for the received UL UCI signal derived from the channel estimation data is greater than the scaled threshold value S·τ then the signal detection module 130 continues processing of the received UL UCI signal in a conventional manner or in accordance with other methods of detecting a full or partial DTX state as described in applicant's pending applications incorporated herein by way of reference. In the conventional case, the signal detection module 130 continues processing of the received UL UCI signal by next processing said received UL UCI signal in the equalizer module 202 in a known manner to provide an equalized signal. The equalized signal is then demodulated, again in a known manner, by a demodulation module 204 which outputs soft bits comprising a demodulated soft bit SEQ to a descrambling module 206, The descrambled soft bit SEQ is inputted to a rate de-matching module 212 which processes the descrambled soft bit SEQ in a known manner to output a de-matched soft bit SEQ to a decoder module 214 which, also in a known manner, generates UCI ACK/NACK bits. In the unconventional manner of continuing processing of the received UL UCI signal, the signal detection module 130 may, for example, be configured to implement the method of pending utility patent application Ser. No. 17/141,725 where the DTX detection method is implemented by processing the descrambled soft hit SEQ to distinguish whether the received UCI signal is a partial or full DTX signal or a non-DTX signal. If the determination is in the affirmative, then processing of the received UL UCI signal may be terminated, but, if the determination is negative, then the descrambled soft bit SEQ of the UL UCI signal may be inputted to the rate de-matching module 212 which processes the descrambled soft bit SEQ in a known manner to output a de-matched soft bit SEQ to a decoder module 214 which, also in a known manner, generates UCI ACK/NACK bits.

It will be appreciated therefore that the method of the invention can be implemented in a conventional UCI receiver device through any of software, firmware and/or hardware changes to the conventional UCI receiver device and is preferably implemented only by way of software changes.

Figure 10:
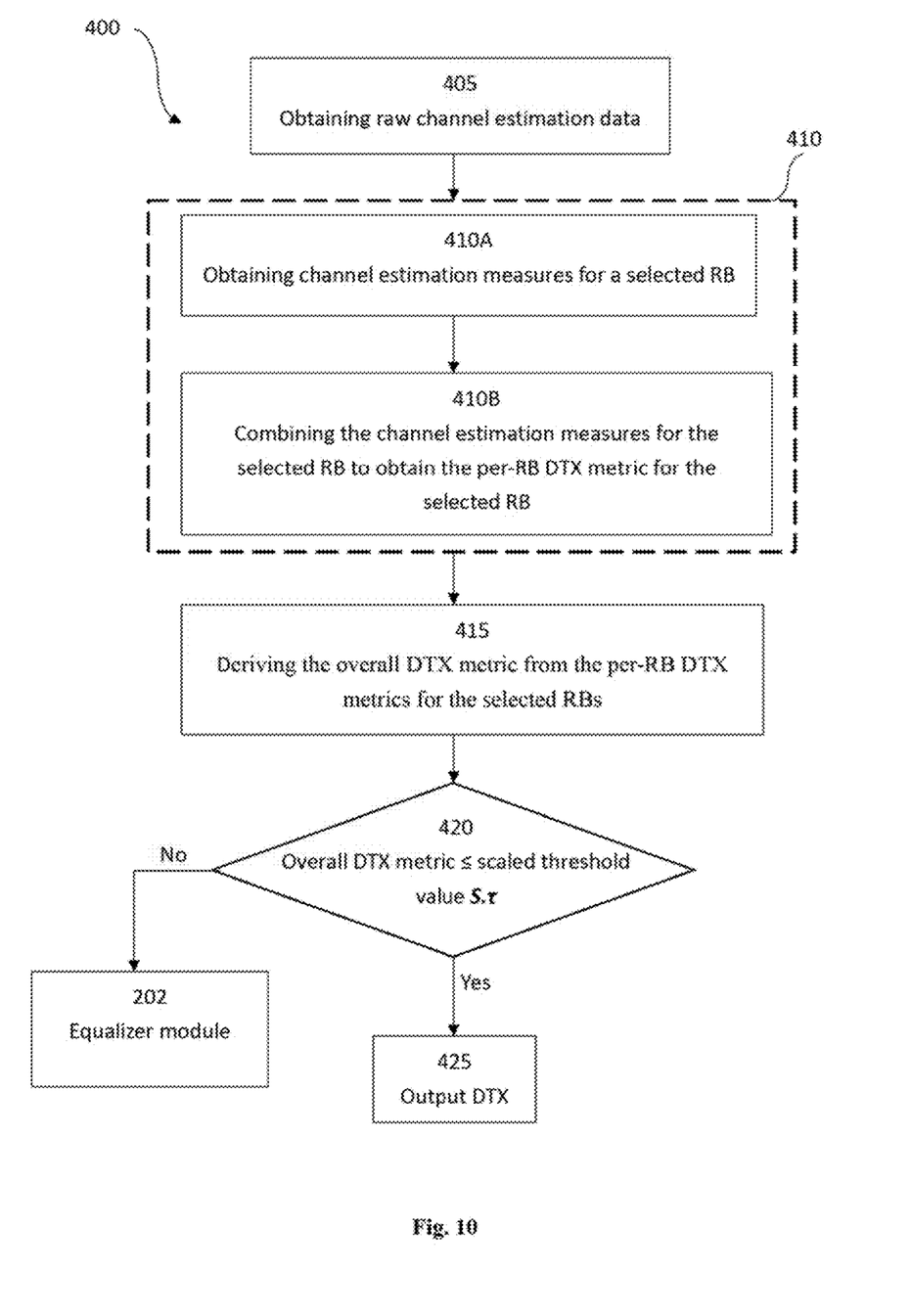
FIG. 10 diagrammatically illustrates modified steps of the method of FIG. 9.

It is preferred that the first step 305 of the method 300 for determining a DTX metric for the received UL UCI signal from the channel estimation data is modified as illustrated by FIG. 10 to include at least the steps of determining from said channel estimation data a per-RB DTX metric for each of the one or more selected RBs and combining said per-RB DTX metrics to determine the DTX metric for the received UL UCI signal as an overall DTX metric.

Referring to FIG. 10 which illustrates the modified method 400, a first step 405 is obtaining the raw channel estimation data from the channel estimation module 201. A next step 410 is to calculate per-RB DTX metric for each of the one or more selected RBs. A next step 415 is to combine said per-RB DTX metrics to determine the overall DTX metric. A next decision step 420 is to compare the overall DTX metric to the scaled threshold value S·τ. If, at decision step 420, it is determined that the overall DTX metric is less than or equal to the scaled threshold value S·τ then, at step 425, the signal detection module 130 outputs an indication that a DTX state is detected in the received UL UCI signal and processing of the received signal may usefully he terminated. If, however, at decision step 420, it is determined that the overall DTX metric is greater than the scaled threshold value S·τ then the signal detection module 130 continues processing of the received UL UCI signal in a conventional manner or in accordance with other methods of detecting a full or partial DTX state as described in applicant's pending applications incorporated herein by way of reference.

The method step 410 of determining a per-RB DTX metric for a selected RB is preferably into a first sub-step 410A of obtaining channel estimation measures for the selected RB and a second sub-step 410B of combining the channel estimation measures for the selected RB to obtain the per-RB DTX metric for the selected RB.

In one embodiment, sub-step 410B may comprise any one or more of the following: obtaining: (i) the sum or mean value of the channel estimation measures of the selected RB or the magnitude of the channel estimation measures of the selected RB; (ii) the sum or mean value of the square or power of the channel estimation measures of the selected RB or the magnitude of the channel estimation measures of the selected RB; and (iii) the moment of the channel estimation measures of the selected RB.

In another embodiment, sub-step 410A may he achieved by deriving the channel estimation measures for the selected RB for a number of dimensions of the selected RB. The number of dimensions may comprise one or more of a temporal dimension, a frequency dimension, and a spatial dimension. The temporal dimension preferably relates to OFDM symbols of the selected RB, the frequency dimension preferably relates to demodulation reference signal (DMRS) subcarriers of the selected RB, and the spatial dimension preferably relates to receive antennas for the selected RB.

Defining the temporal dimension as "Dim 1" for OFDM symbols (l=0, 1, . . . L-1)), the frequency dimension as "Dim 2" for DMRS subcarriers (k=0, 1, 2, 3) where k denotes the index of the four DMRS subcarriers in the selected RB, and defining the spatial dimension as "Dim 3" for the receive antennas (n=0, 1, . . . N-1), any of the channel estimation measures for Dim 1, Dim 2 and/or Dim 3 for the selected RB may be derived from the following equation:

$$D(m) = \sum_{n=0}^{N-1} abs\left(\sum_{k=0}^{3}\sum_{l=0}^{L-1} h_{nkl}(m)\right)^2$$

where $h_{nkl}(m)$ comprises the raw channel estimation data; and m is the RB index of the selected RB.

For Dim 2, the frequency dimension, the selected RB contains four DMRS subcarriers (k=0, 1, 2, 3) where each subcarrier for the n-th antenna in the l-th OFDM symbol corresponds to one raw channel estimate value $h_{nkl}(m)$.

Once the channel estimation measures for the one or more dimensions Dim 1, Dim 2, and Dim 3 of the selected RB have been obtained in sub-step 410A, the method involves combining, in sub-step 410B, the channel estimation measures to obtain the per-RB DTX metric for the selected RB. The sub-step 410B of combining the channel estimation measures may comprise: (i) determining a sum or mean of the channel estimation measures over the temporal and frequency dimensions Dim 1, Dim 2; (ii) determining a sum of a square of the magnitude of the channel estimation measures over the spatial dimension Dim 3; and combining (i) and (ii) to derive the per-RB DTX metric for the selected RB.

Once the per-RB DTX metric for each of the selected RBs have been obtained, the method 400 proceeds to step 415 of deriving the overall DTX metric from the per-RB DTX metrics for the selected RBs.

In one embodiment, step 415 comprises deriving the overall DTX metric from the per-RB DTX metrics for the selected RBs by combining said per-RB DTX metrics for the selected RBs to obtain one or more of: (i) sum or mean value of the channel estimation measures of the selected RBs or the magnitudes of the per-RB DTX metrics for the selected RBs; (ii) sum or mean value of the square or power of the channel estimation measures of the selected RBs or the magnitudes of the per-RB DTX metrics for the selected RBs; and (iii) moment of the combined per-RB DTX metrics.

In one embodiment comprising a first option, the overall DTX metric denoted as $\hat{D}$ comprises a low complexity option of combining the per-RB DTX metrics for the selected RBs according to the equation:

$$\hat{D} = \frac{1}{M_{DTK}} \sum_{m=M-M_{DTX}}^{M-1} D(m)$$

where M RBs are used for PUCCH; and where $M_{DTX}$ is the number of selected or dropped RBs.

This option for determining an overall DTX metric $\hat{D}$ is more suited for detecting a full. DTX state, but it is less computationally complex to implement than a second option as hereinafter described.

The overall DTX metric $\hat{D}$ of the first option follows a chi-square distribution with a degree of freedom defined by $M_{DTX} \cdot N$, i.e., $x^2(M_{DTX} \cdot N)$. Thus:

$$\hat{D} = \frac{1}{M_{DTX}} \sum_{m=M-M_{DTX}}^{M-1} D(m) = \frac{1}{M_{DTX}} \sum_{m=M-M_{DTX}}^{M-1} \sum_{n=0}^{N-1} abs\left(\sum_{k=0}^{3}\sum_{l=0}^{L-1} h_{nkl}(m)\right)^2 =$$

$$\frac{1}{M_{DTX}} \sum_{m=M-M_{DTX}}^{M-1} \sum_{n=0}^{N-1} \left(\left(real\left(\sum_{k=0}^{3}\sum_{l=0}^{L-1} h_{nkl}(m)\right)\right)^2 + \left(imag\left(\sum_{k=0}^{3}\sum_{l=0}^{L-1} h_{nkl}(m)\right)\right)^2\right)$$

Given that the noise is $h_{nkl}(m) \sim CN(0,\beta^2)$, the above equation can be resolved to:

$$\frac{M_{DTX}}{16L^2\sigma^2}\hat{D} \sim X^2(M_{DTX}N)$$

For the first option where the overall DTX metric is to be compared to the scaled threshold value S·τ in decision step 420 to detect the presence of a DTX state in the received UL UCI signal, the scaling factor S is determined from:

$$S = \frac{16L^2}{M_{DTX}}\sigma^2$$

where $\sigma^2$ is the estimated noise power or variance of the received UL UCI signal;

$M_{DTX}$ is the number of RBs that are dropped due to DTX; and

L is the number of OFDM symbols;

and the normalized DTX threshold τ is determined from:

$$\tau = 2 \cdot gammaincinv\left(1 - P_r, \frac{M_{DTX}N}{2}\right)$$

where N is the number of antennas;
Pr is the target false alarm rate (FAR);
gammaincinv(1-Pr) comprises the inverse function of the incomplete gamma function.

For this embodiment comprising the first option for step 415, the scaling factor S is simple to calculate and can therefore be calculated on the fly as and when called. However, it is preferred to predetermine the threshold r which, because it is independent of any specific realization, can be determined in advance and stored it in, for example, a lookup table (LUT) in the memory 140 of the UCI receiver 100/200.

The final step 420 of the method 400 for this embodiment of the method comprises comparing overall DTX metric $\hat{D}$ to the scaled threshold value S·τ such that where $\hat{D} \leq S \cdot \tau$, then output a DTX state signal or where where $\hat{D} > S \cdot \tau$, then determine that no DTX state has occurred.

In another embodiment comprising the second option, improvements in detecting a partial DTX state can be obtained by first determining a DTX metric $\tilde{D}$ for non-DTX RBs, i.e., RBs validly used even on the occurrence of a full or partial DTX state, and then obtaining a ratio $\hat{r}$ of the overall DTX metric $\hat{D}$ of option 1 to the DTX metric $\tilde{D}$ for on-DTX RBs.

DTX metric $\tilde{D}$ for non-DTX RBs may be obtained from the equation:

$$\tilde{D} = \frac{1}{M - M_{DTX}} \sum_{m=0}^{M-M_{DTX}-1} D(m)$$

The overall DTX metric according to the second option comprising the ratio $\hat{r}$ may be obtained from:

$$\hat{r} = \frac{\hat{D}}{\tilde{D}} = \frac{\frac{1}{M_{DTX}} \sum_m^{(DTX)} D(m)}{\frac{1}{M - M_{DTX}} \sum_m^{(non-DTX)} D(m)}$$

The overall DTX metric of option 2 comprising the ratio $\hat{r}$ is independent of noise variance and thus flexible to use. It characterizes more accurately the properties of a partial DTX state more so than a full DTX state.

The reciprocal of the ratio $\hat{r}$ comprising the overall DTX metric of the second option follows a non-central F-distribution such that:

$$\hat{r} = \frac{\hat{D}}{\tilde{D}} = \frac{\frac{1}{M_{DTX}} \sum_{m=M-M_{DTX}}^{M-1} \sum_{n=0}^{N-1} \left( \left( real\left( \sum_{k=0}^{3} \sum_{l=0}^{L-1} n_{nkl}(m) \right) \right)^2 + \left( imag\left( \sum_{k=0}^{3} \sum_{l=0}^{L-1} n_{nkl}(m) \right) \right)^2 \right)}{\frac{1}{M - M_{DTX}} \sum_{m=0}^{M-M_{DTX}-1} \sum_{n=0}^{N-1} \left( \left( real\left( \sum_{k=0}^{3} \sum_{l=0}^{L-1} n_{nkl}(m) \right) \right)^2 + \left( imag\left( \sum_{k=0}^{3} \sum_{l=0}^{L-1} n_{nkl}(m) \right) \right)^2 \right)}$$

Given that in an additive white Gaussian noise (AWGN) channel $h_{nkl}(m) = \bar{h} + n_{nkl}(m)$, $n_{nkl}(m) \sim CN(0, \beta^2)$ and $\bar{h}^2 = \beta^2 \cdot SNR$, the equation can be reduced to:

$$\frac{1}{\hat{r}} \sim F(d_1, d_2, \lambda)$$

where $d_1 = (M - M_{DTX})N$;

$d_2 = M_{DTX}N$;

$d_1' = \frac{(d_1 + \lambda)^2}{d_1 + 2\lambda}$; and $\lambda = 16L^2 N(M - M_{DTX})SNR$.

Approximating this to a central F-distribution, we obtain:

$$\frac{d_1}{d_1 + \lambda} \frac{1}{\hat{r}} \sim F(d_1', d_2), \, d_1' = \frac{(d_1 + \lambda)^2}{d_1 + 2\lambda}$$

which enables the scaled threshold value S·τ to be obtained from:

$$S = \frac{d_1}{d_2} \frac{d_1 + \lambda}{d_1 + 2\lambda}$$

and $$\tau = \frac{1}{betaincinv\left(Fr, \frac{d_1'}{2}, \frac{d_2}{2}\right)} - 1$$

where betaincinv is the inverse function of the incomplete Beta function.

For this embodiment comprising the second option for step 415, the scaling factor S is also simple to calculate and can therefore be calculated on the fly as and when called based on the already estimated SNR. However, it is preferred to predetermine the threshold τ in advance and stored it in, for example, a lookup table (LUT) in the memory 140 of the UCI receiver 100/200.

The final step 420 of the method 400 for this embodiment of the method comprises comparing overall DTX metric $\hat{r}$ to the scaled threshold value S·τ such that where $\hat{r} \leq S \cdot \tau$, then output a DTX state signal or where where $\hat{r} > S \cdot \tau$, then determine that no DTX state has occurred.

In the various embodiments of the methods of the invention, the one or more selected RBs may be selected based on one or more assumed DTX conditions derived from potential DTX scenarios. The one or more assumed DTX conditions may comprise an assumption that the one or more selected RBs exhibit a DTX state or comprise an assumption of a number of RBs that are not being validly used due to occurrence of a full or partial DTX state. The method may be applied iteratively starting with a lowest value of a selected one of the one or more assumed DTX conditions.

The method of the invention may be combined with other methods of determining the presence or existence of a DTX state or a partial DTX state.

The method of the invention may include determining the presence or existence of a DTX state or a partial DTX state when any one of the following conditions is met: (i) all of the combined methods for determining the presence or existence of a DTX state or a partial DTX state indicate existence of a DTX state or a partial DTX state; (ii) at least one of the combined methods for determining the presence or existence of a DTX state or a partial DTX state indicate existence of a DTX state or a partial DTX state; or at least a predetermined number of the combined methods for determining the presence or existence of a DTX state or a partial DTX state indicate existence of a DTX state or a partial DTX state.

The linear block code may be Reed-Muller (RM) code or RM-based super code.

The invention provides a UCI receiver device 100 for a wireless communication system. The UCI receiver device 100 comprises a memory 140 storing machine-readable instructions and a processor 150 for executing the machine-readable instructions such that, when the processor 150 executes the machine-readable instructions, it configures the UCI receiver device 100 to implement the afore-described methods in accordance with the invention.

The invention provides a non-transitory computer-readable medium 140 storing machine-readable instructions, wherein, when the machine-readable instructions are executed by a processor 150, they configure the processor 150 to implement the afore-described methods in accordance with the invention.

The invention aims to provide a method and apparatus for detecting partial discontinuous transmission in PUCCH using raw channel estimation data. The invention is capable of distinguishing partial DTX with low FAR and low MDR by comparing, for example, the average of DTX metrics for the dropped RBs with the scaled threshold during the channel estimation stage.

The calculation of the per-RB DTX metric for each dropped RB is highly advantageous, in that, the per-RB DTX metric of each dropped RB is determined or calculated and an overall, averaged DTX metric is derived from the combination of the per-RB DTX metrics of the dropped RBs. The overall DTX metric is compared with the scaled threshold to determine the existence of a DTX state.

In a more preferred embodiment, a ratio of overall DTX metric with an averaged non-DTX metric for non-DTX RBs is derived and subsequently the resulting ratio is compared with the scaled threshold to determine the existence of DTX. This is particularly suitable for the detection of partial DTX.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can he executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of detecting a discontinuous transmission state (DTX) at an uplink control information (UCI) receiver device in a wireless communication system, the method comprising the steps of:
receiving a linear block encoded signal on an uplink (UL) at said UCI receiver device;
processing the received linear block encoded signal after resource element (RE) demapping to obtain channel estimation data;
determining from said channel estimation data a DTX metric for one or more selected resource blocks (RBs); and
determining if a DTX state has occurred by comparing the determined DTX metric to a calculated, selected, or predetermined threshold.

2. The method of claim 1, wherein the channel estimation data comprises raw channel estimation data obtained by multiplying one or more received reference signals by one or more conjugates of corresponding local reference signals.

3. The method of claim 1, wherein the one or more selected RBs are selected based on one or more assumed DTX conditions derived from potential DTX scenarios.

4. The method of claim 3, wherein the one or more assumed DTX conditions comprises an assumption that die one or more selected RBs exhibit a DTX state or comprises an assumption of a number of RBs that are not being validly used due to occurrence of a full or partial DTX state.

5. The method of claim 3, wherein the method is applied iteratively starting with a lowest value of a selected one of the one or more assumed DTX conditions.

6. The method of claim 1, wherein the received linear block encoded signal is processed to obtain channel estimation data prior to the received linear block encoded signal being processed by an equalizer module of said UCI receiver device.

7. The method of claim 6, wherein processing of the received linear block encoded signal is terminated once it is determined that a DTX state has occurred.

8. The method of claim 1, wherein the step of determining from said channel estimation data a DTX metric for one or more selected RBs comprises:
determining from said channel estimation data a per-RB DTX metric for each selected RB; and
deriving said DTX metric as an overall DTX metric for the selected RBs from the per-RB DTX metrics for the selected RBs.

9. The method of claim 8, wherein the step of determining if a DTX state has occurred comprises comparing said overall DTX metric to the calculated, selected, or predetermined threshold $\tau$ modified by a scaling factor S.

10. The method of claim 8, wherein the overall DTX metric is modified by a DTX metric determined for non-selected RBs to provide a ratio $\hat{r}$ of the overall DTX metric to the DTX metric for the non-selected RBs.

11. The method of claim 10, wherein the step of determining if a DTX state has occurred comprises comparing said ratio $\hat{r}$ to the calculated, selected, or predetermined threshold $\tau$ modified by a scaling factor S.

12. The method of claim 8, wherein the step of determining from said channel estimation data a per-RB DTX metric for a selected RB comprises:
obtaining channel estimation measures for the selected RB; and
combining the channel estimation measures for the selected RB to obtain the per-RB DTX metric for the selected RB.

13. The method of claim 12, wherein the channel estimation measures for the selected RB are derived from one or more dimensions of the selected RB.

14. The method of claim 13, wherein the one or more dimensions comprise one or more of a temporal dimension, a frequency dimension, and a spatial dimension.

15. The method of claim 14, wherein the temporal dimension relates to orthogonal frequency division multiplexing (OFDM) symbols of the selected RB, the frequency dimension relates to demodulation reference signal (DMRS) sub-carriers of the selected RB and the spatial dimension relates to receive antennas for the selected RB.

16. The method of claim 14, wherein the step of combining the channel estimation measures for the selected RB to obtain the per-RB DTX metric for the selected RB comprises:
(i) determining a sum or mean of the channel estimation measures over the temporal and frequency dimensions;
(ii) determining a sum of a square of the magnitude of the channel estimation measures over the spatial dimension; and
combining (i) and (ii) to derive the per-RB DTX metric for the selected RB.

17. The method of claim 8, wherein the step of deriving the overall DTX metric from the per-RB DTX metrics for the selected RBs comprises:
combining said per-RB DTX metrics for the selected RBs to obtain one or more of:
(i) sum or mean value of the channel estimation measures of the selected RBs or the magnitudes of the per-RB DTX metrics for the selected RBs;
(ii) sum or mean value of the square or power of the channel estimation measures of the selected RBs or the magnitudes of the per-RB DTX metrics for the selected RBs; and
(iii) moment of the combined per-RB DTX metrics.

18. The method of claim 1, wherein the method if combined with other method of determining if a DTX state has occurred.

19. An uplink control information (UCI) receiver in a wireless communication system, the UCI receiver device comprising:
a memory staling machine-readable instructions; and
a processor for executing the machine-readable instructions such that, when the processor executes the machine-readable instructions, it configures the UCI receiver device to:
process a received linear block encoded signal after resource element (RE) demapping to obtain channel estimation data;
determine from said channel estimation data a DTX metric for one or more selected resource blocks (RBs); and
determine if a DTX state has occurred by comparing the determined DTX metric to a calculated, selected, or predetermined threshold.

20. A non-transitory computer-readable medium storing machine-readable instructions, wherein, when the machine-readable instructions are executed by a processor of a UCI receiver device in a wireless communication system, they configure the processor to:
process a received linear block encoded signal after resource element (RE) demapping to obtain channel estimation data;
determine from said channel estimation data a DTX metric for one or more selected resource blocks (RBs); and
determine if a DTX state has occurred by comparing the determined DTX metric to a calculated, selected, or predetermined threshold.

* * * * *

UNITED STATES PATENT AND TRADEMARK OFFICE
CERTIFICATE OF CORRECTION

PATENT NO. : 11,457,502 B2
APPLICATION NO. : 17/171190
DATED : September 27, 2022
INVENTOR(S) : Yaming Luo et al.

It is certified that error appears in the above-identified patent and that said Letters Patent is hereby corrected as shown below:

In the Specification

1. In Column 4, Line 38, "LIE" should be corrected to "LTE";

2. In Column 4, Line 54, "$\hat{H}_{53\,i\,B}$" should be corrected to "$\hat{H}_{i\,n}$";

3. The two paragraphs in Column 11, Lines 7-13, should be combined into a single paragraph;

4. In the formulas in Column 11, Line 45 and Column 13, Lines 55-65, each instance of "i=0" should be corrected to "l=0";

5. In the formula in Column 12, Lines 38-41, the first and third occurrence of "i=0" should be corrected to "l=0" and the second occurrence of "i=0" should be corrected to "l=1";

6. In Column 12, Line 45 and Column 14, Lines 2 and 3, the symbol "β" should be corrected to "σ" each time it appears;

7. In the formula in Column 13, Lines 32-35, the first "-" should be corrected to "=";

8. In the formula in Column 13, Line 1, "$P_r$," should be corrected to "Pr".

Signed and Sealed this
Eighth Day of November, 2022

*Katherine Kelly Vidal*
Katherine Kelly Vidal
*Director of the United States Patent and Trademark Office*